United States Patent [19]

McElroy

[11] Patent Number: 4,855,193
[45] Date of Patent: Aug. 8, 1989

[54] BIPOLAR FUEL CELL

[75] Inventor: James F. McElroy, Suffield, Conn.

[73] Assignee: United Technologies Corporation, Hartford, Conn.

[21] Appl. No.: 132,697

[22] Filed: Dec. 14, 1987

Related U.S. Application Data

[63] Continuation of Ser. No. 876,968, Jun. 20, 1986, abandoned.

[51] Int. Cl.$^4$ .................. H01M 8/10; H01M 4/86
[52] U.S. Cl. ........................................ 429/30; 429/41; 429/44
[58] Field of Search ................ 429/18, 30, 33, 41, 429/44

[56] References Cited

U.S. PATENT DOCUMENTS

| | | | |
|---|---|---|---|
| 3,297,490 | 1/1967 | Barber et al. | 429/44 X |
| 3,382,105 | 5/1968 | McBryar et al. | 424/30 |
| 4,152,489 | 5/1979 | Chottiner | 429/44 X |
| 4,215,183 | 7/1980 | MacLeod | 429/30 |
| 4,390,603 | 6/1983 | Kawana et al. | 429/30 |

Primary Examiner—Stephen J. Kalafut

[57] ABSTRACT

The present invention discloses an improved fuel cell utilizing an ion transporting membrane having a catalytic anode and a catalytic cathode bonded to opposite sides of the membrane, a wet-proofed carbon sheet in contact with the cathode surface opposite that bonded to the membrane and a bipolar separator positioned in electrical contact with the carbon sheet and the anode of the adjacent fuel cell. Said bipolar separator and carbon sheet forming an oxidant flowpath, wherein the improvement comprises an electrically conductive screen between and in contact with the wet-proofed carbon sheet and the bipolar separator improving the product water removal system of the fuel cell.

3 Claims, 5 Drawing Sheets

BIPOLAR FUEL CELL

The Government has rights in this invention pursuant to Contract No. LANL 9-X53-D6272-1 awarded by the Department of Energy.

This application is a continuation of Ser. No. 876,968, filed June 20, 1986, now abandoned.

DESCRIPTION

1. Technical Field

The technical field to which this invention pertains is bipolar fuel cells in particular to inventions related to the removal of reaction water in ion permeable membrane fuel cells.

2. Background Art

Vertical fuel cell stacks which comprise an ion transport membrane, (these are typically referred to as solid polymer electrolytes) having an anode and a cathode in intimate contact with opposite sides of the ion membrane and having the fuel cell having bipolar separators between the anode of one cell and the cathode of a second cell thereby forming the flow field for both the oxidant and the fuel as well as conducting the electrons generated at the anode of one fuel cell to the cathode of an adjacent cell are well known.

One of the constant problems facing the fuel cell engineer developing fuel cells of this type is the constant presence of the water produced at the cathode of an ion membrane fuel cell during the reaction of the oxidant with the hydrogen ions

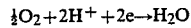

$$\tfrac{1}{2}O_2 + 2H^+ + 2e \rightarrow H_2O$$

The resulting water, if not removed from the surface of the cathode can prevent the oxidant from passing into the porous cathode substrate and being available for reaction at the cathode catalyst/membrane interface. When this condition occurs, the fuel cell's efficiency suffers and will eventually reach a point where the cell shuts down. This phenomena is called "flooding".

One approach to solving this flooding problem was to place a wet-proofed carbon sheet over the surface of the cathode substrate facing the oxidant flow field. This caused the water, which was produced at the cathode, to form droplets on the surface of the wet-proofed sheet. These water droplets were then removed either by gravity or through the increased flow of oxidant or a combination of both.

However, the prior art fuel cells still suffer from flooding as the product water removal systems are not perfect. This is graphically demonstrated by the graph "A" in FIG. 1 which depicts a prior art cell operating on air as the oxidant. As may be seen, the cell current voltage drops off dramatically when current is drawn from the cell in excess of about 225 amps per square foot. (The same or similar decrease in efficiency would occur if oxygen were used as the oxidant, only it might require a longer operating time before it manifests itself.)

Therefore, what is needed in the art is an improved water removal system which will be efficient and compatible with the bipolar fuel cell construction of the prior art.

DISCLOSURE OF INVENTION

The present invention discloses an electrically conductive screen which is positioned between and in contact with the wet-proofed cathode surface and the bipolar separator of an ion transporting membrane fuel cell. This screen will act to disrupt water droplets developed on the wet-proofed surface and cause the formation of smaller water droplets which may be drawn away from the surface of the cathode and by gravity directed toward the bottom of the fuel cell more easily.

Other features and advantages will be apparent from the specification and claims and from the accompanying drawings which illustrate an embodiment of the invention.

All cross-sectional views of the fuel cell are looking down into the cell.

BEST MODE FOR CARRYING OUT THE INVENTION

Figure 2:
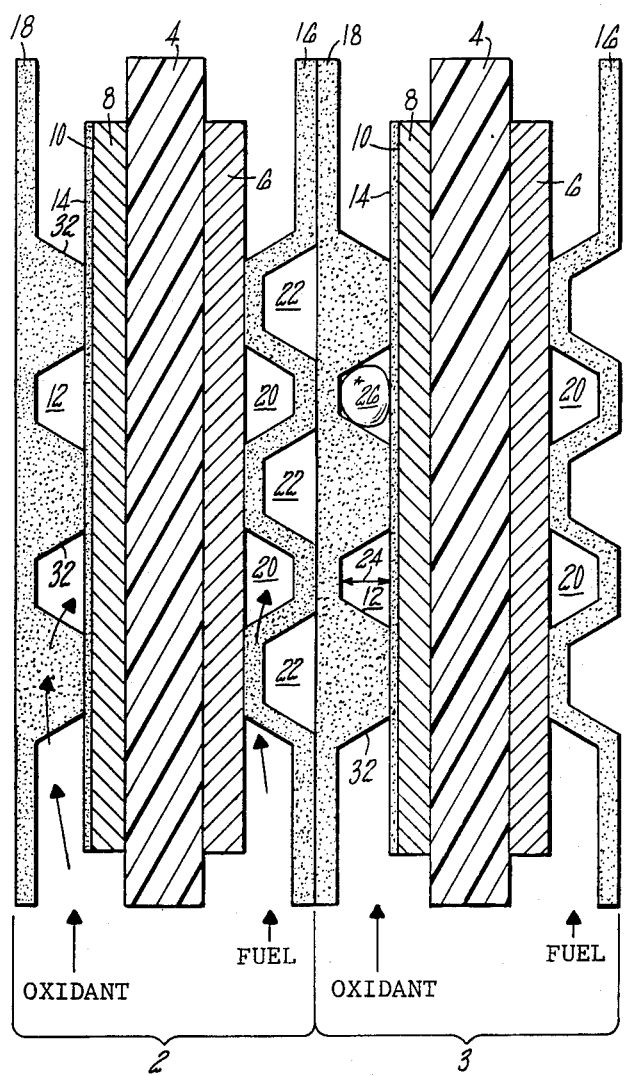
FIG. 2 is a cross-sectional view of a prior art fuel cell.

FIG. 2 is a cross-sectional view of the prior art fuel cells 2 and 3 in vertical stack arrangement based on ion transporting membranes and having bipolar separators. The typical cell stack comprises a plurality of cell units 2 and 3 having an ion transporting membrane 4 sandwiched between and in intimate contact with a catalytic anode 6 and a catalytic cathode 8 positioned on opposite surfaces of the membrane 4 as shown. The cathode surface 10 in contact with the oxidant flow field 12 having a wet-proofed layer of graphite 14 bonded to which aids in product water removal from the cell.

Since these fuel cells 2 and 3 are used in vertical stacks, bipolar separators 16 and 18 are used to separate the anode 6 from the adjacent cell cathode 8. These separators are generally formed to define flow fields 12 and 20 for the oxidant and the fuel respectively. Also, since the fuel cells produce heat, a cooling passage 22 for the flow of a cooling medium is often positioned between the bipolar separators 16 and 18. Additionally, and one of the great advantages of these bipolar separators is that they conduct the electrons released at the anode 6 of one fuel cell through to the cathode 8 of the adjacent cell. This reduces the internal resistance of the cell, by eliminating the need for edge current collectors, and increases the cell efficiency by reducing the distance the electrons must travel.

However, to maintain this advantage, the bipolar separator must be in electrical contact with the cathode and the anode and the distance between each must be kept small. Typically, the bipolar separator is a thin sheet formed of carbon and will typically have a thickness of about 60 to about 120 mils. Since the distance between the separator and the electrodes is small, obviously the flow fields formed are also small. Typically the gap 24 defining the flow fields between the cathode wet-proofed sheet 14 and the bipolar separator 18 is about 10 mils to about 50 mils. In addition, the bipolar separator usually will have parallel ribs 32 machined or embossed along the length of the separator, thereby forming the flow fields 12 and 20 in conjunction with the wet-proofed cabon paper 14 and the anode 6 for the passage of the oxidant and fuel gases.

It is believed that the small gap size required for these structures results in the water droplets 26 forming on the surface of the wet-proofed cathode which are large enough to span the gap, and are not easily dislodged, thereby blocking the flow field sufficiently, to cause the cell to function irradically and eventually causing the cell to flood.

It has been found that by introducing one or more electrically conductive screens 30 (FIG. 3) between and in contact with the cathode wet-proofed surface 14 of the cathode 8 and the bipolar separator 18, that the droplets formed may be reduced in size so as not to block the entire flow field and are easily removed from the flow field by gravity or oxidant flow or a combination of both.

The screens of the present invention may be made from any transitional metal such as tantalum, titanium, niobium, etc. or gold or platinum or other compatible material. The limiting parameters in selecting a particular material are cost, compatibility with the fuel cell environment and weight. The preferred material is titanium. This material is light, relatively inexpensive and is compatible with the fuel cell environment. These screens should be protected against oxidation prior to placement into the fuel cell, as oxidation products will impair the fuel cell operation. To accomplish this, it is preferred that the screen surface be platinized with about a 1 micron layer of platinum to prevent oxidation. This may be done using conventional platinizing techniques. Other methods for protecting against oxidation may be used if desired.

The screens are typically about 3 mils to about 10 mils in thickness and will have openings ranging from about 20 to about 160 mils at the largest aspect of the opening. The aspect ratio of the openings will vary due to the method of manufacturing the screen, however, the important dimension is the largest one for each opening and should be within the dimensions described above. These figures roughly correspond to screen manufacturers' 2/0 to 5/0 screen sizes with the 3/0 being preferred.

Many of these screens are commercially available and it is contemplated that they may be manufactured by any number of methods such as knitting or weaving wire to form a traditional screening pattern or they may be formed from expanded sheet metal. The expanded metal technique for manufacturing such screens is the preferred and is conventional. Such screening is available from X-Met Corporation, Bridgeport, Conn.

Figure 3:
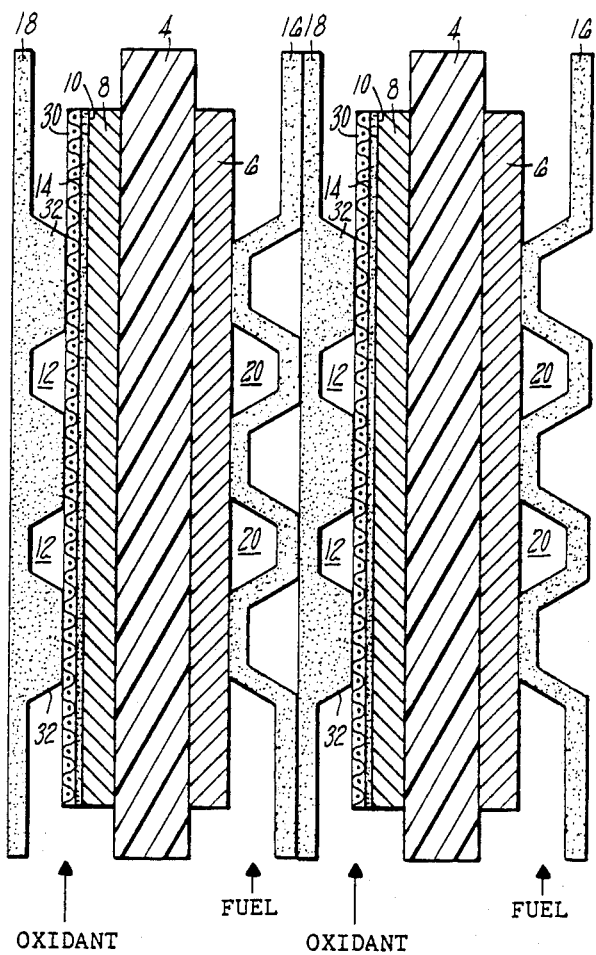
FIG. 3 is a cross-sectional view of the improved fuel cell of this invention.
Figure 4:
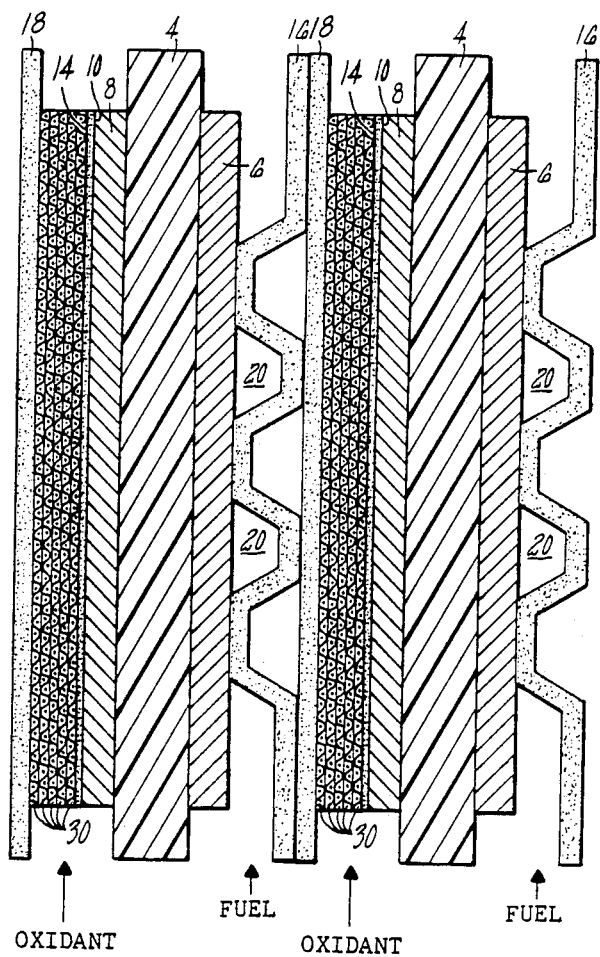
FIG. 4 is a cross-sectional view of an alternative design of the prior invention.
Figure 5:
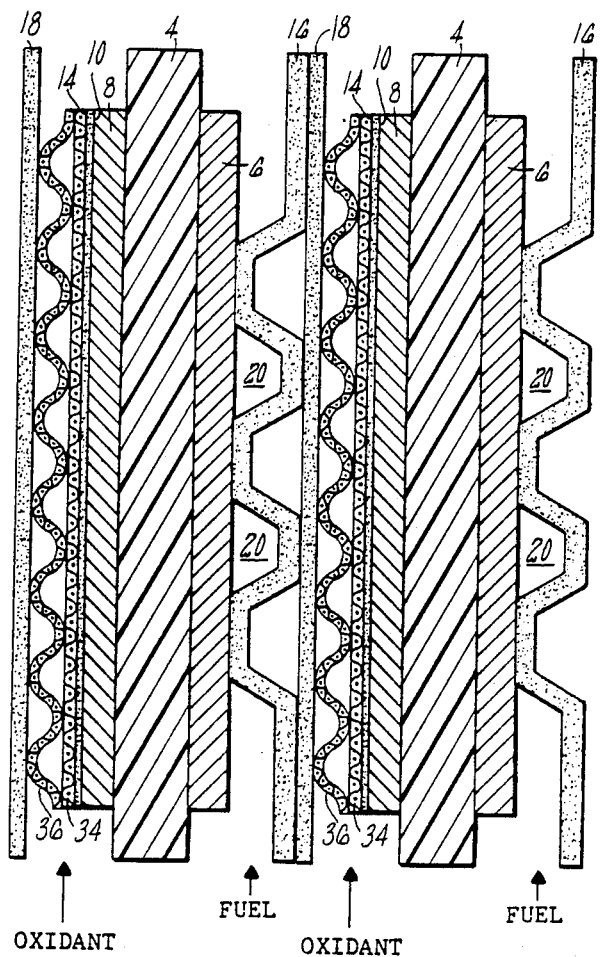
FIG. 5 is a cross-sectional view of an alternative design of the prior invention.

FIG. 3 depicts the improved fuel cell design having a ribbed, bipolar separator 16 in contact with an anode 6 forming flow passages 20 for the fuel, an ion transport membrane 4 and a cathode 8 having a wet-proofed graphite paper layer 14 attached to the cathode surface 10. (Only a single fuel cell is depicted here, however a fuel cell stack as described in FIG. 2 is envisioned.) A second ribbed, bipolar separator 18 has had the ribs 32 machined down to allow the introduction of an electrically conductive screen 30 between and in electrical contact with the bipolar separator 18 and the wet-proofed paper 14. Other configurations which may be used are depicted in FIGS. 4 and 5. FIG. 4, the configuration actually used in the Example, has the same basic configuration as that of FIG. 3 except that the ribs 32 have been totally machined away leaving an open flow field which may then be filled with a plurality of screens 30 as shown in FIG. 4 or a flat screen 34 coupled with an undulating or wavy screen 36 as depicted in FIG. 5.

It should be pointed out that all of these screens must make electrical contact with and between the wet-proofed graphite layer of the cathode and the bipolar separator to allow for easy passage of the electrons between these two fuel cell constituents.

EXAMPLE

To evaluate any improvement achieved by the introduction of the screen, a test cell was prepared and operated using air as the oxidant. The cell was 0.05 square foot and the anode and cathode were each loaded with 2 $mg/cm^2$ platinum catalyst. The fuel was hydrogen supplied at 30 psig and the cell temperature was 220° F. (104.4° C.), the air oxidant was supplied at 60 psig, and the ion transport membrane was Nafion ® 117, having a thickness of 7 mils (dry) with an ion exchange capacity of 0.94 milliequivalent $H^+$/g dry membrane. The water content of the membrane is 42 weight percent and the resistivity is 0.22 ohm-$cm^2$ and is available from DuPont Corporation, Wilmington, Del.

Figure 1:
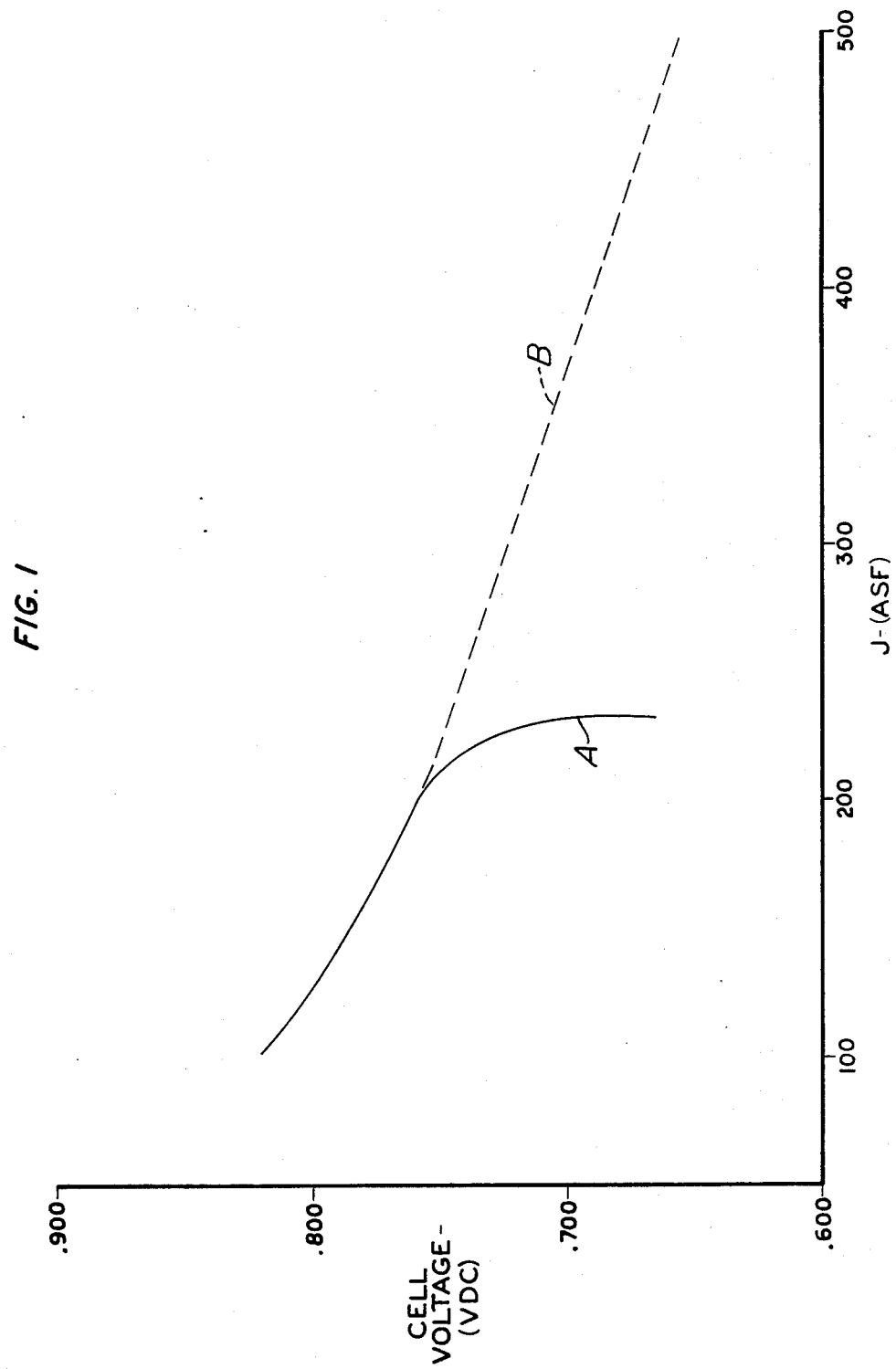
FIG. 1 is a graph depicting the performance of a prior art fuel cell and the improved fuel cell of this invention.

The cell was initially operated without the screens and the results are depicted in FIG. 1 as "A" in which the cell exhibited a dramatic drop of voltage as the result of internal losses, when operated at currents in excess of about 225 amps per square foot.

The cell was then prepared by removing the flow channels forming an oxidant distribution cavity 0.050 mils deep. Inserted into the cavity were 5 niobium 3/0 screens each 10 mils thick (purchased from X-Met Corporation, Bridgeport, Conn.). The cell was assembled and operated under the same conditions as above. Good initial performance of 0.673 volts direct current (VDC) at 500 amps per square foot (ASF) was obtained for the first five hours of endurance with no instability observed. The cell then ran over a 70 hour period at which time the voltage stabilized at 0.645 VDC with no voltage instability as demonstrated by curve "B" of FIG. 1.

In conclusion, the introduction of the metallic screens into the cathode cavity to aid in removing product water from the surface of the cathode markedly improves the performance of the fuel cells. The screen reduces flooding of the cell and leads to more stable cell performance at higher current densities and for longer periods of time than fuel cells without the improvement.

It should be understood that the invention is not limited to the particular embodiments shown and described herein, but that various changes and modifications may be made without departing from the spirit and scope of this novel concept as defined by the following claims.

I claim:

1. A fuel cell stack comprising two or more fuel cells each having a catalytic anode and a catalytic cathode in contact with opposite surfaces of an ion transporting membrane, a wet-proofed carbon paper bonded to the cathode surface opposite the membrane, a bipolar separator in contact with the wet-proofed carbon paper and forming an oxidant flow field, said bipolar separator being in electrical contact with the anode of a second fuel cell; wherein the improvement comprises a plurality of electrically conductive screens between and in electrical contact with the wet-proofed carbon paper and the bipolar separator resulting in improved product water removal and improved fuel cell performance.

2. The article of claim 1 wherein the electrically conductive screen is formed if expanded metal.

3. The article of claim 2 wherein the screen is a metal selected from the group consisting of tantalum, titanium, niobium, gold and platinum.

* * * * *